US009153954B2

(12) United States Patent
McGee et al.

(10) Patent No.: US 9,153,954 B2
(45) Date of Patent: Oct. 6, 2015

(54) DEVICE AND PROCESS FOR PROTECTION AGAINST EXCESSIVE VOLTAGE AND/OR CURRENT IN SYSTEMS HAVING USB CONNECTIONS AND THE LIKE

(71) Applicant: SERVICE SOLUTIONS U.S. LLC, Charlotte, NC (US)

(72) Inventors: Phillip McGee, Owatonna, MN (US); Christopher Roberts, Stockport Cheshire (GB)

(73) Assignee: Bosch Automotive Service Solutions Inc., Warren, MI (US)

( * ) Notice: Subject to any disclaimer, the term of this patent is extended or adjusted under 35 U.S.C. 154(b) by 213 days.

(21) Appl. No.: 13/664,646

(22) Filed: Oct. 31, 2012

(65) Prior Publication Data
US 2013/0107409 A1 May 2, 2013

Related U.S. Application Data

(60) Provisional application No. 61/553,670, filed on Oct. 31, 2011.

(51) Int. Cl.
H02H 9/04 (2006.01)
H02H 9/02 (2006.01)

(52) U.S. Cl.
CPC H02H 9/02 (2013.01); H02H 9/041 (2013.01)

(58) Field of Classification Search
CPC ................................. H02H 9/02; H02H 9/041
USPC ....................................................... 361/91.1
See application file for complete search history.

(56) References Cited

U.S. PATENT DOCUMENTS

| 6,775,121 | B1* | 8/2004 | Chaudhry ..................... 361/111 |
| 7,497,737 | B2* | 3/2009 | Mikolajczak et al. ... 439/620.29 |
| 8,619,397 | B2* | 12/2013 | Mikolajczak ................... 361/56 |
| 2009/0265057 | A1 | 10/2009 | Chinnadurai et al. |
| 2009/0299539 | A1* | 12/2009 | Chinnadurai et al. ........ 700/293 |
| 2011/0286168 | A1* | 11/2011 | Scheucher ............... 361/679.01 |

OTHER PUBLICATIONS

International Search Report and Written Opinion issued in related application No. PCT/US2012/062697 on Feb. 5, 2013.

* cited by examiner

Primary Examiner — Thienvu Tran
Assistant Examiner — Kevin J Comber
(74) Attorney, Agent, or Firm — Baker & Hostetler LLP

(57) ABSTRACT

An apparatus is provided to electrically protect a circuit for USB protection against excessive voltage and/or current such as ground loop damage. A circuit is connected between electrical components where at least one of the connections is a USB connection. There is a possibility for the ground points of the electrical components to be at different voltage potentials and can create a ground loop. The apparatus can include a voltage limiting circuit connected to circuit lines which connect to the USB connection, and circuit breakers or resistors can be connected to the circuit lines between the USB connection and the connection to the other electrical component. In some aspects, the connections at either end of the circuit can all be USB connections. The components of the apparatus protect the connected electrical components from receiving more power than they can tolerate, and protect a user of the electrical components from injury caused by excess power.

19 Claims, 6 Drawing Sheets

DEVICE AND PROCESS FOR PROTECTION AGAINST EXCESSIVE VOLTAGE AND/OR CURRENT IN SYSTEMS HAVING USB CONNECTIONS AND THE LIKE

CROSS-REFERENCE TO RELATED APPLICATIONS

This application claims the benefit from U.S. Provisional Application No. 61/553,670 filed on Oct. 31, 2011, which is hereby incorporated by reference in its entirety for all purposes as if fully set forth herein.

FIELD OF THE INVENTION

The invention relates generally to a protection device for a vehicle communication interface (VCI), a diagnostic tool, a scan tool, a Personal Computer (PC), a diagnostic computer, a vehicle, and/or the like. More particularly, the invention relates to electrically protecting connections between one or more of the VCI, a diagnostic tool, a scan tool, a PC, a diagnostic computer, a vehicle and other components to prevent damage and to prevent injury to a user from excessive voltage and/or current.

BACKGROUND OF THE INVENTION

Modern vehicles typically have one or more diagnostic systems, generally having separate computer control modules or electronic control units (ECUs) to control various functions of the vehicle. Some examples include a powertrain control module (PCM), engine control module (ECM), transmission control module (TCM), and anti-locking brake system (ABS). The vehicle diagnostic systems often have self-diagnostic capability to detect and alert the driver of problems the vehicle may be encountering. When a problem is found, a diagnostic trouble code or DTC is set within the computer's memory. DTCs are as general or as specific as the manufacturer desires.

To retrieve and decipher DTCs, an auto repair technician needs to connect to the vehicle and be able to communicate with the vehicle. A device, such as one or a combination of a VCI, a diagnostic tool, a scan tool, a PC or the like is typically used to communicate, retrieve, and decipher the DTCs. In one typical implementation, the VCI translates between the vehicle communication protocol and a PC communication protocol. In this case, the communication protocol between the VCI and the PC may be a Universal Serial Bus (USB). In this scenario, the PC serves as the user interface portion of the diagnostic system. Alternatively, one could use a scan tool, which would communicate with the vehicle directly and has its own discrete user interface. The VCI is typically equipped to communicate in various communication protocols such as Controller Area Network (CAN), SAE J1850 VPW, PWM, ISO 9141, and others. These communication protocols may be specific to the various automobile manufacturers and others may be fairly standardized, at least at the physical layer.

A cable is typically used to interface the VCI with the vehicle. Although the VCI typically has a SAE J1962 type connector having 16 pins for various communications, controls and measurements, the use of different pins for different functions varies between the different modules in the vehicle and can also vary with different manufactures of the vehicles. In some instances, the VCI may implement other types of connectors and other types of cables may be substituted for the cable with the SAE J1962 type connector, for example an Ethernet cable or a universal serial bus (USB) cable. Similarly, the VCI may also be connected to other devices and the vehicle itself by one of these cables.

The VCI connection supplies a ground signal to the devices connected to it so that, for example, the diagnostic tool can use that signal as a reference signal. Without a good ground signal, the measurements received by the diagnostic tool may not be accurate. The ground signal can be from the vehicle ground.

A problem known with this approach involves excessive voltage and/or current such as ground loop damage to the associated components. For example, a ground loop can occur in a conductor connecting two points that are intended to be at the same potential, often ground, but are actually at different potentials. Ground loops created by improperly designed or improperly installed equipment are a major cause of noise and interference in electrical systems. They can also create an electric shock hazard, since ostensibly "grounded" parts of the equipment, which are often accessible to users, are not at ground potential. When multiple components are connected together, such as the VCI and the diagnostic tool, the components may include ground points which could be at different potentials and cause a ground loop.

Accordingly, it is desirable to provide an apparatus to protect the electrical components of the connected devices from damage, and to protect a user of the devices from injury that could be caused by excessive voltage and/or current such as a ground loop.

SUMMARY OF THE INVENTION

The foregoing needs are met, to a great extent, by the invention, wherein in one aspect an apparatus is provided that in some aspects, can provide electrical protection capabilities to a cable that connects a diagnostic tool to a VCI. Additionally the apparatus can provide electrical protection between any devices connected by a USB cable or the like.

In accordance with an aspect of the invention, a system for electrically protecting a circuit, includes a plurality of means for conducting, including a first power line, a ground line and a first data line, wherein the ground line and the first data line each have a first portion and a second portion; means for limiting voltage electrically connected to the first power line, the first portion of the ground line, and the first portion of the first data line, and a plurality of means for limiting current, wherein a first means for limiting current is electrically connected to the first portion of the ground line and to the second portion of the ground line, and a second means for limiting current is electrically connected to the first portion of the first data line and to the second portion of the first data line.

In accordance with another aspect of the invention, an apparatus for electrically protecting a circuit, includes a plurality of electrical conductors, including a first power line, a ground line and a first data line, wherein the ground line and the first data line each have a first portion and a second portion, a first voltage limiting device electrically connected to the first power line, the first portion of the ground line, and the first portion of the first data line, and a plurality of current limiting devices, wherein a first current limiting device is electrically connected to the first portion of the ground line and to the second portion of the ground line, and a second current limiting device is electrically connected to the first portion of the first data line and to the second portion of the first data line.

There has thus been outlined, rather broadly, certain aspects of the invention in order that the detailed description thereof herein may be better understood, and in order that the present contribution to the art may be better appreciated.

There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
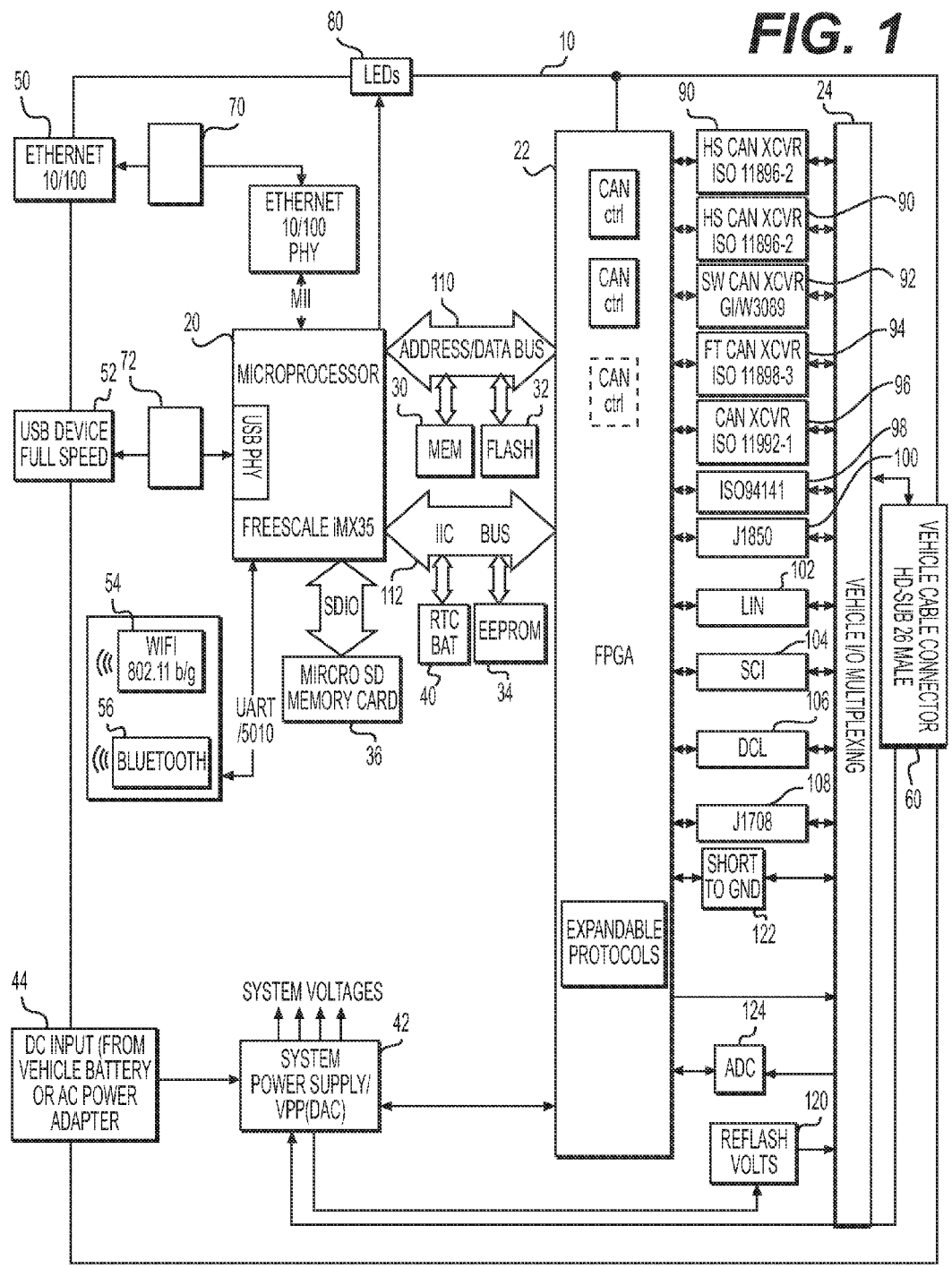
FIG. 1 is a block diagram of a VCI that can be connected to a cable and that can include an apparatus for protection against excessive voltage and/or current such as ground loop damage according to one aspect of the invention.

The invention will now be described with reference to the drawing figures, in which like reference numerals refer to like parts throughout. An aspect in accordance with the invention provides an apparatus for USB protection against excessive voltage and/or current such as ground loop damage. In a specific aspect, the invention protects a diagnostic tool and a VCI connected to each other when respective ground points of the connected device are at different potentials.

FIG. 1 is a block diagram of a VCI that can be connected to a cable and that can include an apparatus for protection against excessive voltage and/or current such as ground loop damage according to one aspect of the invention. In particular, FIG. 1 depicts a block diagram of a VCI 10 according to one aspect of the invention. The VCI 10 can include numerous components such as the following: an electrical signal processing device, a memory device, a power device, a peripheral device connector, a vehicle connector, a circuit protection device, a display, a communication protocol device, an electrical signal bus and so on. This list of VCI 10 components is exemplary and in no way limiting the number and types of components that can make up the VCI 10.

The electrical signal processing device of the VCI 10 can be implemented in many aspects, some of which can include multiple electrical signal processing devices. In one aspect of the VCI 10, the electrical signal processing device can be a programmable device, such as a microprocessor 20, a field programmable gate array (FPGA) 22, a complex programmable logic device (CPLD not shown), or other programmable logic devices. One such programmable logic device may be configured as a multiplexer 24. Other aspects may include non-programmable, hardware implementations of the electrical signal processing device. The VCI 10 may include a varying number of illuminated LEDs 80, patterns of illuminated LEDs 80, colors of illuminated LEDs 80, or flashing sequences of illuminated LEDs 80, can indicate different messages. One or more of the LEDs 80 may be controlled by the microprocessor 20 and one or more of the LEDs 80 may be controlled by the FPGA 22. It should be noted that any type of lighting or display device including LCDs are contemplated as well, and such lighting and display devices are within the scope and spirit of the invention.

The memory device of the VCI 10 can similarly be implemented in a variety of forms, and in some aspects multiple memory devices can be implemented. The varieties of memory devices 30 can include volatile, non-volatile, solid state, magnetic, optical, permanent, removable, writable, rewriteable, read-only memory and the like. Some examples of the memory that can be used to implement the VCI 10 can include random-access memory (RAM) 30, flash memory 32, electrically erasable programmable read-only memory (EEPROM) 34, and Secure Digital (SD) memory 36. Each of these memory device examples may be implemented in any of their various different forms, which can be selected depending on their purpose and/or application.

The power device can also be implemented in numerous ways, and in some aspects multiple power devices can be implemented. Various aspects of the power device can include a battery or a power supply device 42. The battery can be a vehicle battery or a battery dedicated for use by the VCI 10. The battery can include a real-time clock, and the battery can be dedicated to running the real-time clock when not otherwise powered by another power source. The power supply device 42 can be implemented to include a power converter, usually to step down the voltage provided from a high voltage power source, such as the vehicle battery or an alternating current (AC) power source, to a level manageable for the VCI 10. A digital-to-analog converter (DAC) can also be a component of the power supply device 42. The DAC can be used to take a digital signal received from the electrical signal processing device (in some aspects, the FPGA 22) and convert the digital signal to a representative analog signal, potentially to apply a voltage to reprogram various components (in some aspects an ECU). The power supply device 42 can also include a power device connector which can include an AC power adapter connector 44 or a direct current (DC) power connector (not shown), which can be connected to the vehicle battery.

Much like the other described devices, the peripheral device connector can be implemented in a variety of forms, and the VCI 10 can include a combination of a number of peripheral device connectors. Some aspects can include peripheral device connectors that are wired and/or wireless. The peripheral device connectors can include wired serial communication connectors, such as an RS-232 connector, an Ethernet connector 50 and USB connector 52, parallel connections and the like. The peripheral device connectors can include wireless connections, such as a Wi-Fi connector 54, a Bluetooth connector 56, wireless broadband, and the like.

The VCI 10 may also include a vehicle connector which can act as the interface between the VCI 10 and the ECUs of the vehicle, and/or as the AC power adapter connector 44. The vehicle connector can be any connector capable of coupling with a connector of the vehicle and effecting communication between the VCI 10 and the ECUs. The type of vehicle connector may be dependent on the number and types of a variety of functionalities of the VCI 10, such as different communication protocols, which can correspond to a necessary number of pins for the vehicle connector. The different pins may receive a signal depending on the implemented functionality. For example, an OBDII connector traditionally includes 16 pins, with each of the pins representing a different signal or connection. In one aspect of the VCI 10, the vehicle connector 60 can be, for example, the ISO 22900 specified 26-pin, High Density D-Sub connector.

Protection of the electrical components of the VCI 10 can be implemented by using the circuit protection device of the invention, which can be positioned on the connection between the various connectors and the electrical components to which they are directly connected. Protection of the diagnostic tool, scan tool, PC, diagnostic computer, vehicle (having a USB connection or the like), and/or the like is also achieved through the use of the circuit protection device of the invention. The circuit protection device prevents or substantially reduces damage to the electrical components of the VCI when an electrical fault, such as a ground loop, occurs. In some aspects, the electrical fault may result from a ground point of a device, connected to the VCI 10 by one of the connectors, being at a different voltage potential than a ground point of the VCI 10, or by another connector device connected to the VCI 10 by another of the connectors. The circuit protection device can be configured to detect the difference in the voltage potential between the ground points, and the circuit protection device can provide a constant resistance, dynamic resistance or circuit breaking action in the connection between the ground points so that a substantially reduced, or zero current runs between the ground points at different voltage potentials. In one aspect of the VCI 10, an Ethernet circuit protection device 70 can be positioned on the connection between the Ethernet connector 50 and the microprocessor 20. Another aspect can include a USB circuit protection device 72 positioned on the connection between the USB connector 52 and the microprocessor 20. The microprocessor 20 may also include a USB PHY that may provide a bridge between the digital and modulated parts of the interface.

A communication protocol device can be included in the VCI 10 to effect the communication between the VCI 10 and the ECUs of the vehicle via a communication protocol. The appropriate software, receivers, and transceivers for each communication protocol can be implemented so that communication can occur. Some such communication protocol devices can be configured for use with individual communication protocols. In one aspect, the VCI 10 can include various high speed, single wire, or fault-tolerant controller area network (CAN) communication protocol devices, such as an ISO 11898-2 communication protocol device 90, GI/W3089 communication protocol device 92, ISO 11898-3 communication protocol device 94, ISO 11992-1 communication protocol device 96, ISO 9141 communication protocol device 98, SAE J1850 communication protocol device 100, LIN communication protocol device 102, SCI communication protocol device 104, DCL communication protocol device 106, SAE J1708 communication protocol device 108 and the like. Alternatively, the SAE J1850 communication protocol device 100, DCL communication protocol device 106, and SAE J1708 communication protocol device 108 may be supported by a single circuit. Each of the communication protocol devices can be positioned between the FPGA 22 and the multiplexer 24. The FPGA 22 and the multiplexer 24 allow the proper communication protocol to be used to communicate with the vehicle. The multiplexer 24 may be connected to the vehicle connector 60 to transfer the signals between the vehicle and the FPGA 22.

To connect each of the electrical components, the VCI 10 can include an electrical signal bus for carrying electrical signals between the electrical components. In one aspect, the electrical signal bus can be a specific type of bus implemented to put certain electrical components in communication with each other. Examples of such busses can include an address/data bus 110, connecting the microprocessor 20, the FPGA 22, the memory devices 30, such as RAM, and the flash memory 32, and an IIC bus 112, connecting the microprocessor 20, the FPGA 22, the RTC 40 with backup battery and the EEPROM 34. Other components can be connected by appropriate wiring between the components desired to be connected. Some connections can be made through specific interfaces as well. In some aspects, the microprocessor 20 may be connected to the Wi-Fi connector 54 and to the Bluetooth connector 56 through a universal asynchronous receiver/transmitter (UART) and/or a Secure Digital Input Output (SDIO) interface and to the Ethernet connector 50 through a media independent interface (MII) and an Ethernet physical transceiver. Other aspects of the invention can also include a connection between the power supply device 42 and a refresh pin 120 of the multiplexer 24, a connection between the multiplexer 24, a ground pin 122 and the FPGA 22, and a connection between the multiplexer 24, an analog-to-digital converter (ADC) 124 and the FPGA 22 and so on to transfer the signals from the ECUs to the VCI 10.

Figure 2:
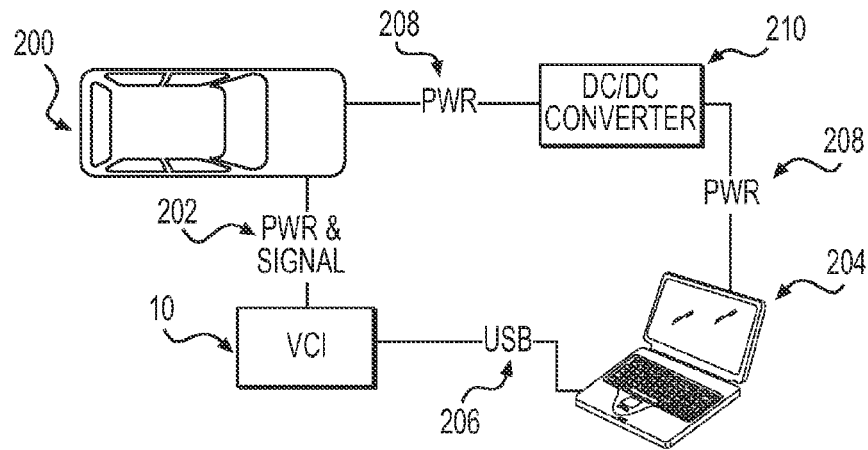
FIG. 2 is a schematic diagram of a potential arrangement of the VCI connected to the vehicle and other components according to an aspect of the invention.
Figure 3:
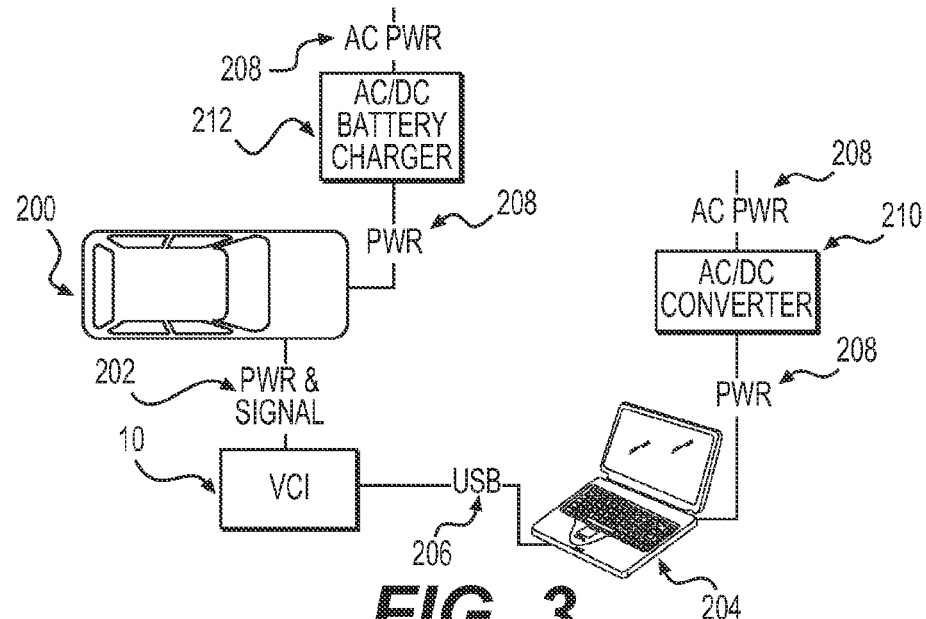
FIG. 3 is a schematic diagram of another potential arrangement of the VCI connected to the vehicle and other components according to an aspect of the invention.
Figure 4:
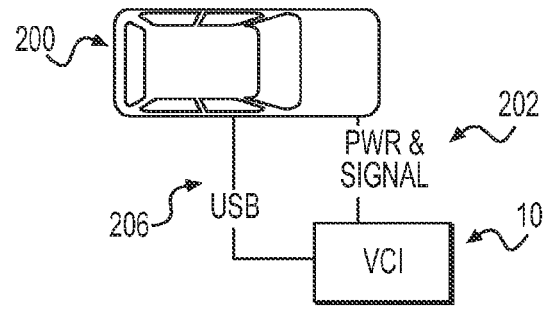
FIG. 4 is a schematic diagram of yet another potential arrangement of the VCI connected to the vehicle according to an aspect of the invention.

FIG. 2 is a schematic diagram of the VCI connected to the vehicle and other components according to an aspect of the invention; FIG. 3 is another schematic diagram of the VCI connected to the vehicle and other components according to an aspect of the invention; and FIG. 4 is yet another schematic diagram of the VCI connected to the vehicle according to an aspect of the invention. In particular, FIGS. 2-4 show a few exemplary ways in which the VCI 10 may be connected to a vehicle 200 and/or other components. In some cases, certain arrangements or connections may cause damage due to excessive voltage and/or current such as a ground loop. Accordingly, these devices will benefit from the use of the protection device of the invention to protect the electrical components of the connected devices from damage, and to protect a user of the devices from injury that could be caused by excessive voltage and/or current such as a ground loop.

In particular, as shown in FIG. 2 the VCI 10 can be connected to the vehicle 200 by a VCI cable 202, which can transmit power and/or signals from the vehicle 200 to the VCI 10. The VCI cable 202 can be any type of cable described herein or otherwise commonly used in the industry. In one aspect, the VCI 10 can be implemented as a component of a system and external to the vehicle 200. In such a system, the VCI 10 can be detached from the vehicle 200, and the vehicle 200 can be operated without being connected to the VCI 10. Another aspect can have the VCI 10 implemented as an integral component of the vehicle 200, housed within the vehicle 200, for example, under the hood of the vehicle 200, in the trunk of the vehicle 200, in the passenger compartment of the vehicle 200 or the like. When the VCI 10 is implemented as an integral component of the vehicle 200, in general, the vehicle 200 will be operated with the connection to the VCI 10 intact. However, it is not beyond consideration that the VCI 10 can still be detached from the vehicle 200, if desired.

The VCI 10 can also be connected to a device, such as a diagnostic tool 204, via a data cable 206, such as a USB cable in one aspect. The device, such as a diagnostic tool 204, may be a general computing device, such as a personal computer (PC), a UNIX workstation, a server, a mainframe computer, a personal digital assistant (PDA), smartphone, cellular phone, a tablet computer, a slate computer, or some combination of these. Alternatively, the device, such as a diagnostic tool 204, may be a specialized computing device, such as a vehicle diagnostic scan tool. The components of the computing device or scan tool may include a processor, a memory, a communication device, a communication interface, a display, an input device, a communication bus, a power interface and the like. Programming code, such as source code, object code or executable code, can be stored on a computer-readable medium that may be loaded in the memory and processed by the processor in order to perform the desired functions of the diagnostic tool 204. The data cable 206 can connect the communication interface of the diagnostic tool 204 to the Ethernet connector 50 or the USB connector 52 of the VCI 10.

The aspect shown in FIG. 2 can include the diagnostic tool 204 being connected to the vehicle 200 for power. The diagnostic tool 204 can be connected to a power source of the vehicle 200, such as the battery or a power outlet, via a power cable 208 and a power converter 210, such as a DC-to-DC, AC-to-DC, or DC-to-AC converter. Some aspects may vary the connection between the power source of the vehicle 200 by, for example, placing additional components (such as an oscilloscope) between the power source of the vehicle 200 and the diagnostic tool 204. Additionally, in some cases the user may connect one of the components (DC-to-DC converter, oscilloscope or the like) such that the component's negative connection is connected to the vehicle battery positive connection. In such cases, there is a potential for excessive voltage and/or current such as a ground loop. The use of the protection device 72 of the invention will help protect the electrical components of the connected devices from damage, and to protect a user of the devices from injury that could be caused by excessive voltage and/or current such as a ground loop.

FIG. 3 depicts an aspect of the connection of the vehicle 200, the VCI 10 and the other components, where the opposite ends of the circuit, created by the connections, are each connected to a separate AC power source. In this example, the vehicle 200 is connected by the power cable 208 to a battery charger 212, which is in turn connected to the AC power source, such as a conventional wall socket or a generator, by the power cable 208. The battery charger 212 of this example converts the AC power from the AC power source to DC power to supply power to the battery of the vehicle 200. Like the aspect of FIG. 2, the VCI 10 can be connected to the vehicle 200 by the VCI cable 202 and connected to the diagnostic tool 204, via the data cable 206. The diagnostic tool 204 can be connected to the AC power source of this aspect via the power cable 208 and the power converter 210. In such cases, there is a potential for excessive voltage and/or current such as a ground loop. The use of the protection device 72 of the invention will help protect the electrical components of the connected devices from damage, and to protect a user of the devices from injury that could be caused by excessive voltage and/or current such as a ground loop.

Another aspect of connecting the VCI 10 to the vehicle 200 is shown in FIG. 4. In this aspect, the VCI 10 is connected to the vehicle 200 by the VCI cable 202 and the data cable 206. In such cases, there may be a lower potential for excessive voltage and/or current such as a ground loop to occur. However, the use of the protection device 72 of the invention will help protect the electrical components of the connected devices from damage, and to protect a user of the devices from injury that could be caused by excessive voltage and/or current such as a ground loop.

The connections between the vehicle 200, VCI 10, and the other components described herein are not meant to be limiting in any way. Numerous variations of the connections are possible, and the descriptions herein are only exemplary.

Figure 5A:
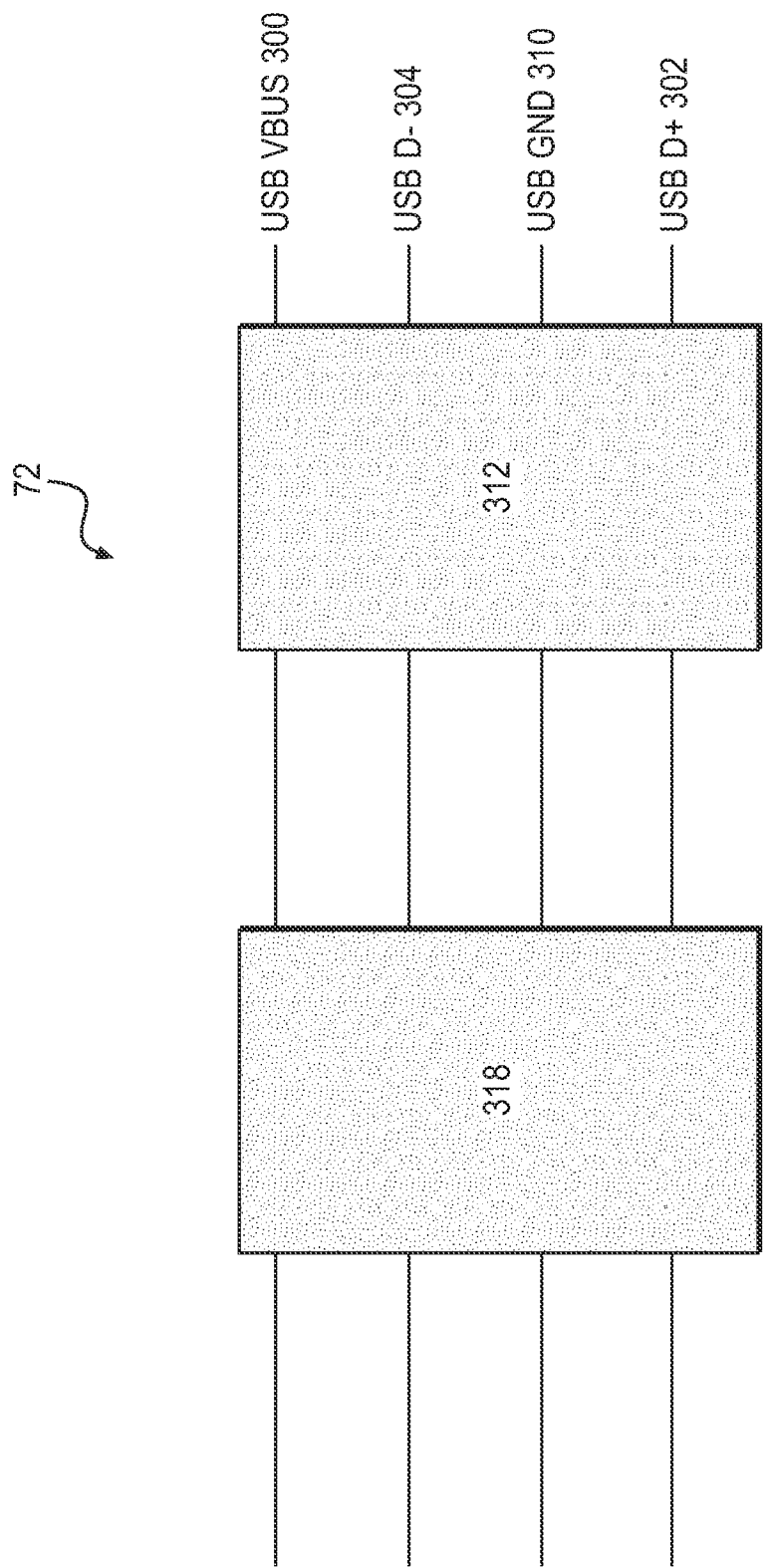
FIG. 5A is a schematic diagram of an electrical protection circuit for protection against excessive voltage and/or current such as ground loop damage according to one aspect of the invention.

FIG. 5A is a schematic diagram of an electrical protection circuit for protection against excessive voltage and/or current such as ground loop damage according to one aspect of the invention. In particular, FIG. 5A is a schematic diagram of an electrical protection circuit for USB protection against excessive voltage and/or current such as ground loop. Although this implementation is shown in the context of a USB based device, the protection device 72 of the invention is intended to work with other types of connectors and/or circuits. The protection device 72 can include a power line (VBUS) 300, data lines, such as D+ 302, D− 304, and a ground line (GND) 310. In one aspect, these circuit lines can connect to a USB connector at the respective terminals for each circuit line. The protection device 72 includes at least one voltage limiting circuit 312 and at least one current limiting circuit 318. The voltage limiting circuit 312 may be implemented using a voltage clamp circuit, a zener diode based circuit, a transient voltage suppressor or the like. The current limiting circuit 318 may be implemented using a resistor, circuit breaker, a transient blocking unit, or the like.

Additionally, the voltage limiting circuit 312 and the current limiting circuit 318 may be configured as a single device to limit voltage across all or some of the data, power, and ground lines. Moreover, the voltage limiting circuit 312 and the current limiting circuit 318 may be implemented as a single component or multiple components. Both the voltage limiting circuit 312 and the current limiting circuit 318 may be implemented using any other known protection devices including for example, optical isolators.

Figure 5B:
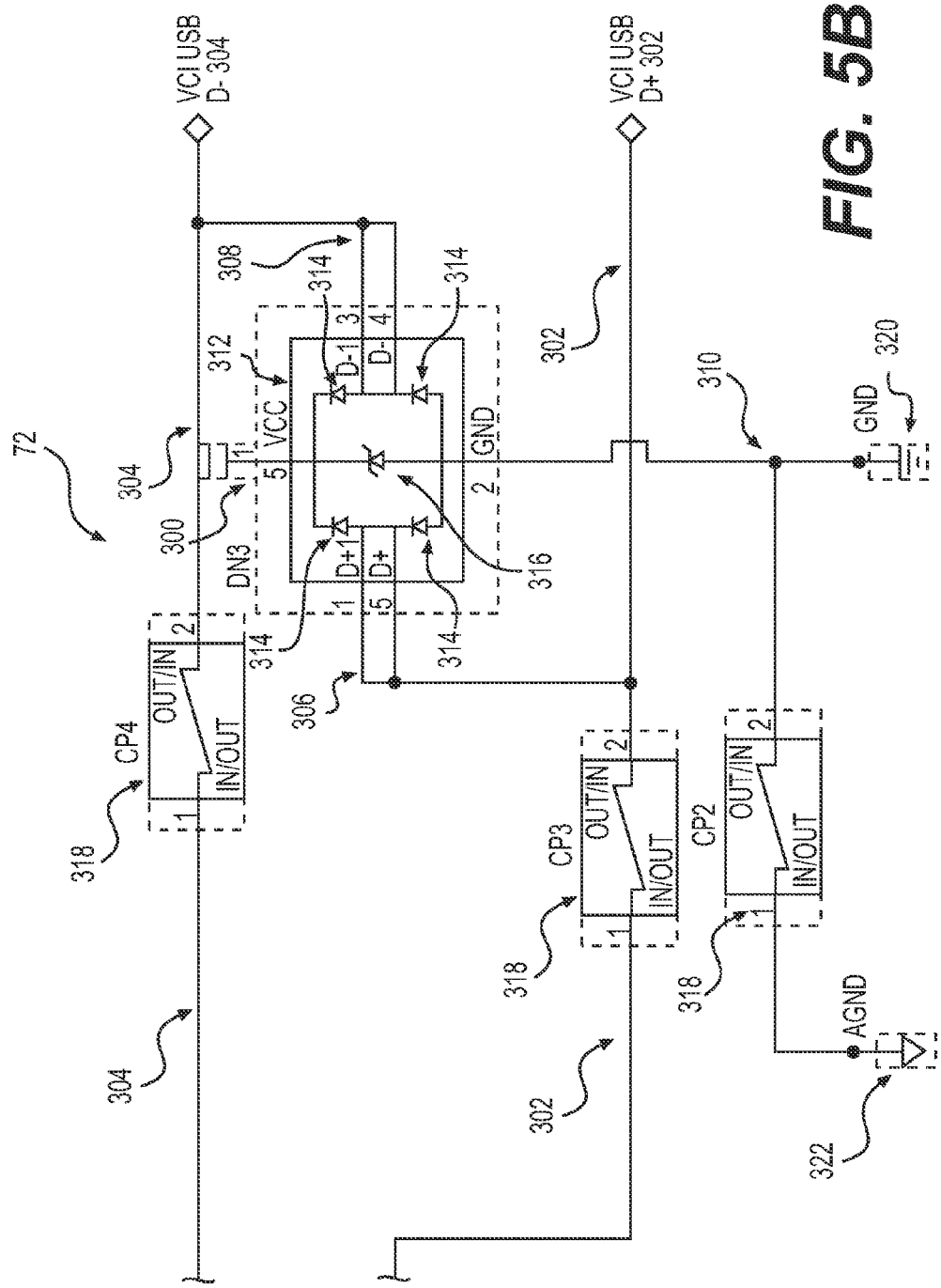
FIG. 5B is a schematic diagram of another aspect of an electrical protection circuit for protection against excessive voltage and/or current such as ground loop damage according to one aspect of the invention.

FIG. 5B is a schematic diagram of an electrical protection device 72 according to another aspect of the invention. The protection device 72 can include a power line (VBUS) 300, data lines, such as D+ 302, D− 304, and a ground line (GND) 310. In one aspect, these circuit lines can connect to a USB connector at the respective terminals for each circuit line.

Another part of the electrical protection device 72 is a voltage limiting circuit such as a transient voltage suppressor (TVS) 312. One aspect of the TVS (voltage limiting circuit 312) may include an array of diodes in the circuit arrangement of the TVS (voltage limiting circuit 312). The diodes of the TVS (voltage limiting circuit 312) can include standard diodes 314, for allowing an electric current to pass in one direction, while blocking current in the opposite direction, and a Zener diode 316, for allowing the current to flow the same as the standard diodes 314, but will also permit the current to flow the reverse direction when the voltage is above a certain value. Other types of diodes or circuit arrangements can be used to implement the functionality of the TVS (voltage limiting circuit 312).

In one aspect of the TVS (voltage limiting circuit 312), the power line 300 can be connected to the cathode side of the Zener diode 316 and the ground line 310 can be connected to the anode side of the Zener diode 316. Further, the TVS (voltage limiting circuit 312) may include four standard diodes 314. The standard diodes 314 can be connected such that two pairs of two standard diodes 314 each contain two standard diodes 314 connected in series, and the two pairs of the standard diodes 314 are connected in parallel. However, additional numbers of standard diodes 314 such as 6, 8, 10, 12, etc. can be used.

In the circuit shown in FIG. 5B, both D+ and D− are shown being split 308, 306 and inputted to the TVS (voltage limiting circuit 312). This is optional when the TVS (voltage limiting circuit 312) has multiple inputs. The data lines can be connected to the TVS (voltage limiting circuit 312) such that lines D+ 302 and D+1 306 are connected between the standard diodes 314 connected in series of one pair of the standard diodes 314, and the lines D− 304 and D−1 304 are connected between standard diodes 314 connected in series of the other pair of the standard diodes 314. The ground line 310 can be connected to the anode side of the parallel connection connecting the pairs of the standard diodes 314, and the power line 300 can be connected to the cathode side of the parallel connection connecting the pairs of the standard diodes 314. The Zener diode 316 can be placed between the connections of the ground line 310 and power line 300 to the standard diodes 314.

Further components of the electrical protection device 72 can include a current limiting circuit 318 such as a transient blocking unit, such as the line of transient blocking units from Bourns® of Riverside, Calif., USA. A transient blocking unit (current limiting circuit 318) can be connected to each of the data lines, D+ 302 and D− 304, and the ground line 310. The transient blocking unit (current limiting circuit 318) can be connected on the circuit lines between the TVS (voltage limiting circuit 312) and an unprotected end of the circuit lines. In one aspect, the transient blocking unit (current limiting circuit 318) connected to the ground line 310 can be positioned between two ground points, for example an earth ground 320 and a signal ground 322. The transient blocking unit (current limiting circuit 318) can be designed to block overvoltages rather than shunt them. In one aspect, the transient blocking units (current limiting circuit 318) can include a circuit breaker, such as a self-resetting, silicon circuit breaker. When the voltage on the circuit line connected to the transient blocking unit (current limiting circuit 318) rises to a predetermined break threshold, the transient blocking unit (current limiting circuit 318) can break the connection of the circuit line to prevent the voltage from affecting the connected electrical components. The transient blocking unit (current limiting circuit 318) can further reestablish the connection of the circuit line when the voltage has decreased below the break threshold. The use of the protection device 72 of FIG. 5B may help protect the electrical components of the connected devices from damage, and to protect a user of the devices from injury that could be caused by excessive voltage and/or current such as a ground loop.

Figure 6:
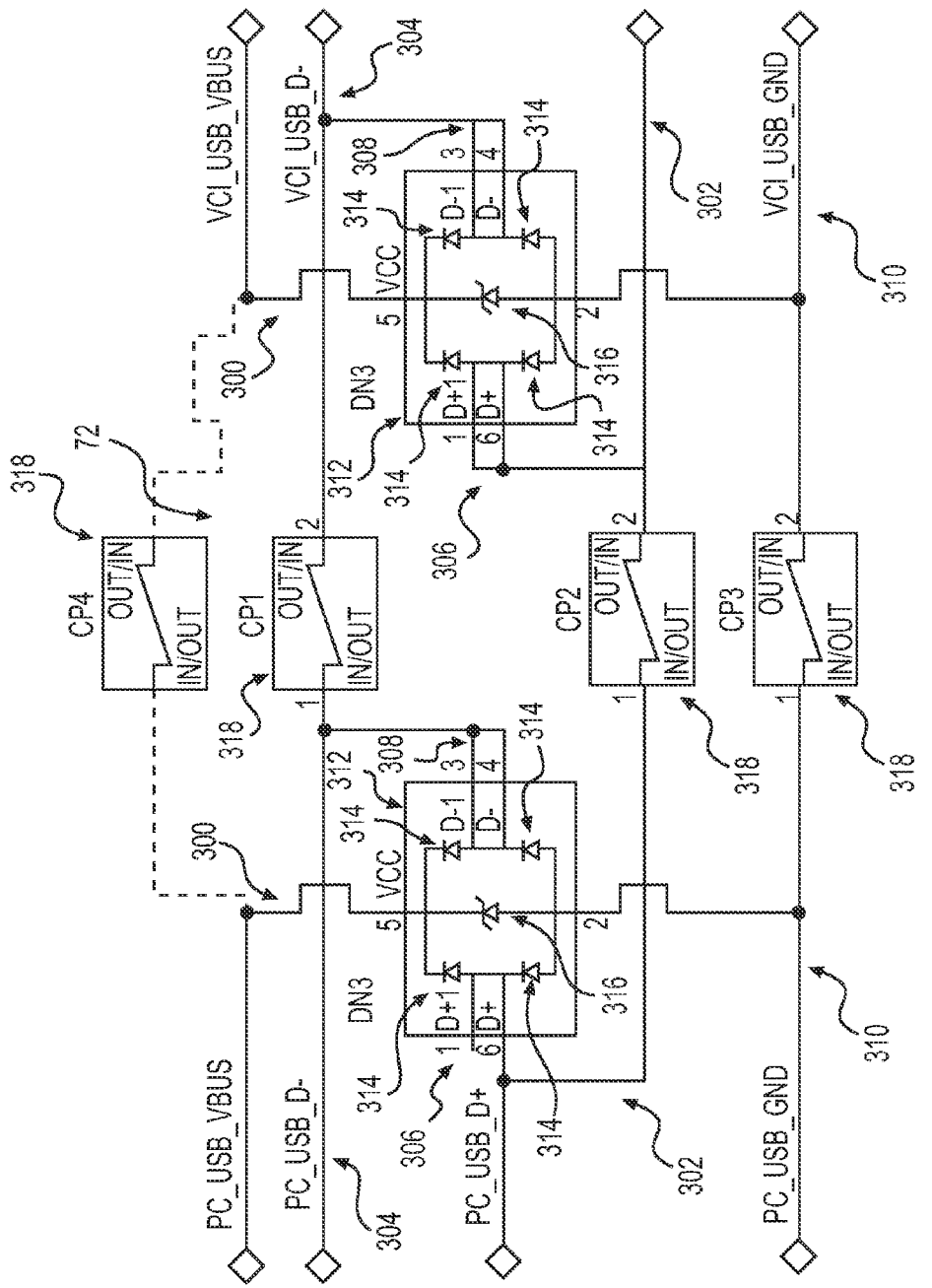
FIG. 6 is a schematic diagram of another aspect of an electrical protection circuit for protection against excessive voltage and/or current such as ground loop damage according to one aspect of the invention.

FIG. 6 is a schematic diagram of an electrical protection circuit for USB protection against excessive voltage and/or current such as ground loop damage according to still another aspect of the invention. In this aspect, the electrical protection device 72 can be placed between plural USB connections. Each USB connection can have the same circuit lines as the other, including the power line 300, the data lines, D+ 302 and D− 304, and the ground line (GND) 310. The TVS (voltage limiting circuit 312) can be connected to the circuit lines similar to the other aspects discussed herein. In this aspect, a TVS (voltage limiting circuit 312) can be connected adjacent to each USB connection of the circuit, thereby resulting in multiple TVSs (voltage limiting circuit 312) being included in the circuit. The transient blocking unit (current limiting circuit 318) can further be connected to the circuit lines similar to the other aspects discussed herein, and connected to the circuit lines between the TVS (voltage limiting circuit 312). The use of the protection device 72 of FIG. 6 may help protect the electrical components of the connected devices from damage, and to protect a user of the devices from injury that could be caused by excessive voltage and/or current such as a ground loop.

Figure 7:
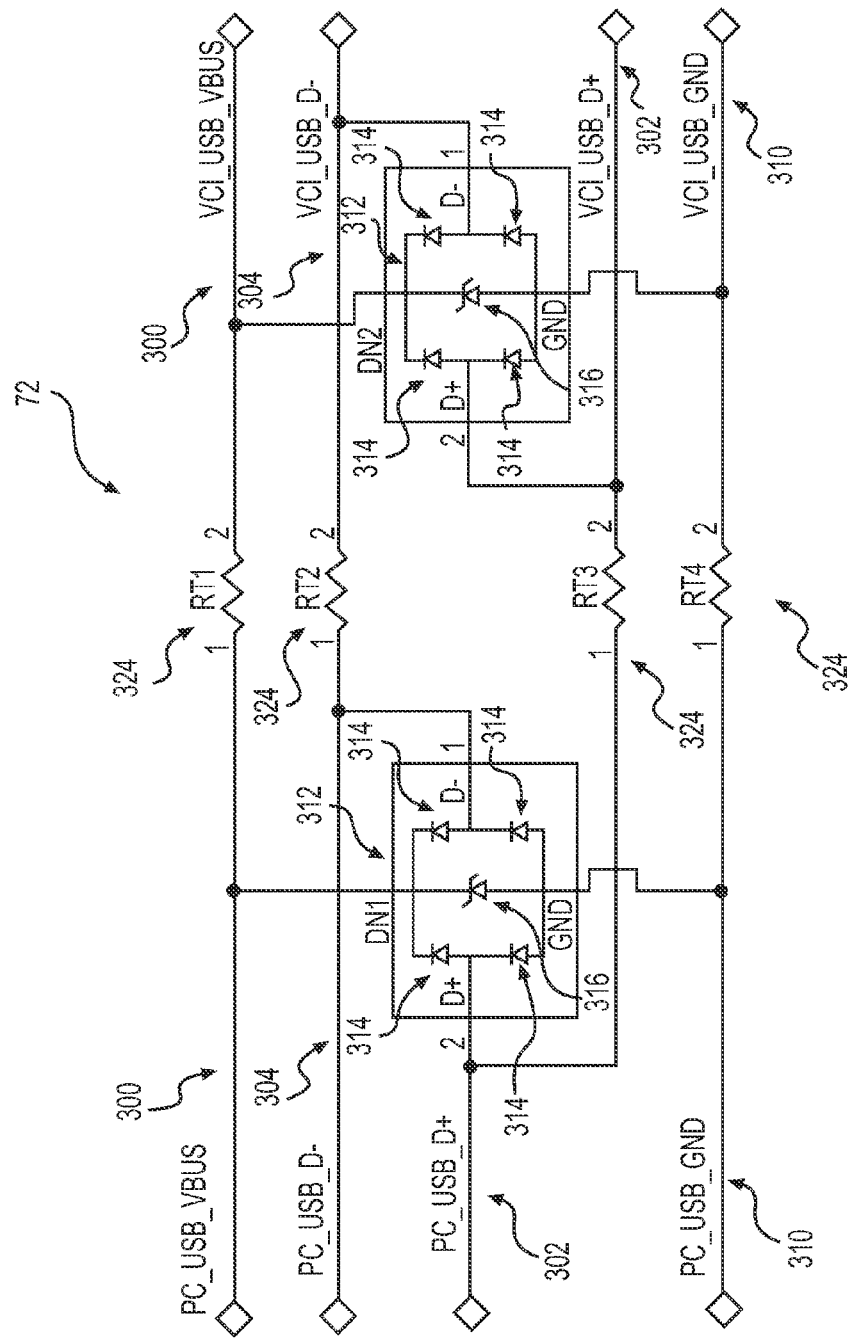
FIG. 7 is a schematic diagram of another aspect of an electrical protection circuit for protection against excessive voltage and/or current such as ground loop damage according to one aspect of the invention.

FIG. 7 is a schematic diagram of an electrical protection circuit for protection against excessive voltage and/or current such as ground loop damage according to another aspect of the invention. In this regard, the electrical protection device 72 can be implemented with resistors 324 rather than the transient blocking unit. In this aspect, the TVS (voltage limiting circuit 312) is connected to the circuit lines where the data lines can be connected to the TVS (voltage limiting circuit 312) such that the line D+ 302 is connected between the standard diodes 314 connected in series with one pair of the standard diodes 314, and the line D− 304 is connected between standard diodes 314 connected in series with the other pair of the standard diodes 314. The ground line 310 can be connected to the anode side of the parallel connection connecting the pairs of the standard diodes 314. The Zener diode 316 can be placed to connect at its anode side with the ground line 310 after the connection to the standard diodes 314 and to connect the Zener diode 316 cathode side to the cathode side of the parallel connection connecting the pairs of the standard diodes 314. The resistors 324 can be placed in connection with the circuit lines such that the resistors 324 connect to the data lines, D+ 302 and D− 304, and the ground line 310 between the circuit lines' respective connections to the TVSs (voltage limiting circuit 312) on either side of the circuit. The resistors 324 can also be connected to the power line 300. Resistor values can be selected for this application by considering what the expected power levels are to be input to the circuit such that the resistors do not provide so much resistance as to impede communication across the circuit. The highest level of resistance that is capable of not interfering with communication on the circuit for its intended application can potentially be high enough to reduce the highest expected power levels, that could be introduced to the circuit as a result of a ground loop, so that damage to the connected electrical components is avoided, as is injury to a user. Accordingly, the use of the protection device 72 of the invention may help protect the electrical components of the connected devices from damage, and to protect a user of the devices from injury that could be caused by excessive voltage and/or current such as a ground loop.

The resistors 324 may also be implemented as Positive Temperature Co-efficient (PTC) type resistors. PTC type resistors increase resistance with temperature, so in the event of a ground loop current or signal line current becoming excessive, heating up the resistor, the PTC resistor increases its resistance as the temperature rises, thus lowering the flowing current. This prevents components from overheating during the ground loop current condition.

Various combinations of the components of the electrical protection device 72 have been provided, including different combinations and arrangements of the transient blocking unit (current limiting circuit 318) and resistors 324. It is provided that the various aspects of the electrical protection circuit for USB protection may be integral to the VCI 10. For example, the USB circuit protection device 72 may be positioned on the connection between the USB connector 52 and the microprocessor 20. Moreover, such electrical protection device 72 can also be embodied as a component separate from the VCI 10 but attachable to an end of one or more of the VCI cable 202, data cable 206, or power cable 208. The electrical protection circuit for USB protection can also be attachable to the component to which the selected cable is to connect, such that the electrical protection device 72 bridges the connection of the cable and the component.

Another aspect considered for the electrical protection device 72, is that the circuit is integral to one or more of the VCI cable 202, data cable 206, or power cable 208. Further, the electrical protection device 72 can be integral to one of the components described herein, such as the vehicle 200, diagnostic tool 204, the power converter 210, or the battery charger 212. It should be noted that the electrical protection device 72 described herein provides protection for a vehicle 200, diagnostic tool 204, VCI 10, scan tool and the like. However, the electrical protection device 72 may be used with other types of devices and groups of devices to provide a similar level of protection.

It should be further noted that although the electrical protection device 72 described herein is well suited for application where a USB type connector is used, the electrical protection device 72 may work well with other types of connectors and/or applications such as Ethernet connectors.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for electrically protecting a vehicle diagnostic circuit, comprising:
    a plurality of electrical conductors, including a first power line, a first ground point, a second ground point, and a first data line, wherein the first data line has a first portion and a second portion;
    a common ground line positioned between the first ground point and the second ground point;
    a first voltage limiting device electrically arranged within a vehicle control interface between an external connection and a vehicle and connected to the first power line, the first ground point, and the first portion of the first data line, the first voltage limiting device having a first Zener diode directly connected to the common ground line; and
    a plurality of current limiting devices, wherein a first current limiting device is electrically connected to the first ground point and to the second ground point, and a second current limiting device is electrically connected to the first portion of the first data line and to the second portion of the first data line.

2. The apparatus of claim 1, further comprising:
    a second data line having a first portion and a second portion;
    the first voltage limiting device electrically connected to the first portion of the second data line; and
    a third current limiting device electrically connected to the first portion of the second data line and the second portion of the second data line.

3. The apparatus of claim 2, further comprising a universal serial bus (USB) connector electrically connected to a first portion of the first power line, the first ground point, the first portion of the first data line, and the first portion of the second data line.

4. The apparatus of claim 1, wherein the first voltage limiting device further comprises a plurality of diodes including a first diode and a second diode.

5. The apparatus of claim 4, wherein each diode comprises a first end and a second end, and wherein the first end of the first diode is electrically connected the first power line, the second end of the second diode is electrically connected to the first ground point, and the second end of the first diode is electrically connected to the first end of the second diode and to the first portion of the first data line.

6. The apparatus of claim 1, further comprising a second voltage limiting device electrically connected to a second power line, the second ground point, and the second portion of the first data line.

7. The apparatus of claim 1, wherein at least one of the plurality of current limiting devices comprise a silicon circuit breaker.

8. The apparatus of claim 1, wherein at least one of the plurality of current limiting devices comprise a transient breaking unit.

9. The apparatus of claim 1, wherein at least one of the plurality of current limiting devices comprise at least one resistor or positive temperature co-efficient resistor.

10. The apparatus of claim 1, wherein the first voltage limiting device further comprises a plurality of diodes including a first diode, a second diode, and a voltage regulating device.

11. A system for electrically protecting a vehicle diagnostic circuit, comprising:
   a plurality of means for conducting, including a first power line, a first ground point, a second ground point, and a first data line, wherein the first data line has a first portion and a second portion;
   a common ground line positioned between the first ground point and the second ground point;
   a first voltage limiting device electrically arranged within a vehicle control interface between an external connection and a vehicle and connected to the first power line, the first ground point, and the first portion of the first data line, the first voltage limiting device having a first Zener diode directly connected to the common ground line; and
   a plurality of current limiting circuits, wherein a first current limiting circuit is electrically connected to the first ground point and to the second ground point, and a second current limiting circuit is electrically connected to the first portion of the first data line and to the second portion of the first data line.

12. The system of claim 11, further comprising:
   a second data line having a first portion and a second portion;
   the voltage limiting circuit is electrically connected to the first portion of the second data line; and
   a third current limiting circuit electrically connected to the first portion of the second data line and the second portion of the second data line.

13. The system of claim 12, further comprising a universal serial bus (USB) connector electrically connected to a first portion of the first power line, the first ground point, the first portion of the first data line, and the first portion of the second data line.

14. The system of claim 11, wherein the voltage limiting circuit comprises a plurality of diodes including a first diode and a second diode.

15. The system of claim 14, wherein each diode comprises a first end and a second end, and
   wherein the first end of the first diode is electrically connected the first power line, the second end of the second diode is electrically connected to the first ground point, and the second end of the first diode is electrically connected to the first end of the second diode and to the first portion of the first data line.

16. The system of claim 11, further comprising a second voltage limiting circuit electrically connected to a second power line, the second ground point, and the second portion of the first data line.

17. The system of claim 11, wherein the current limiting circuits comprise at least one of a silicon circuit breaker, a transient breaking unit, at least one resistor, and at least one positive temperature co-efficient resistor configured to connect a first circuit having the first ground point and a second circuit having the second ground point to the common ground line.

18. The system of claim 11, wherein the voltage limiting circuit comprises a plurality of diodes including a first diode, a second diode, and a voltage regulating device.

19. A process for electrically protecting a vehicle diagnostic circuit, comprising:
   arranging a plurality of electrical conductors, including a first power line, a first ground point, a second ground point, and a first data line, wherein the first dataline has a first portion and a second portion;
   a common ground line positioned between the first ground point and the second ground point;
   arranging a first voltage limiting device electrically arranged within a vehicle control interface between an external connection and a vehicle and connected to the first power line, the first ground point, and the first portion of the first data line, the first voltage limiting device having a first Zener diode directly connected to the common ground line; and
   arranging a plurality of current limiting devices, wherein a first current limiting device is electrically connected to the first ground point and to the second ground point, and a second current limiting device is electrically connected to the first portion of the first data line and to the second portion of the first data line.

* * * * *